Oct. 18, 1938.  C. BREER  2,133,419
CLUTCH
Filed Jan. 18, 1934   2 Sheets-Sheet 1
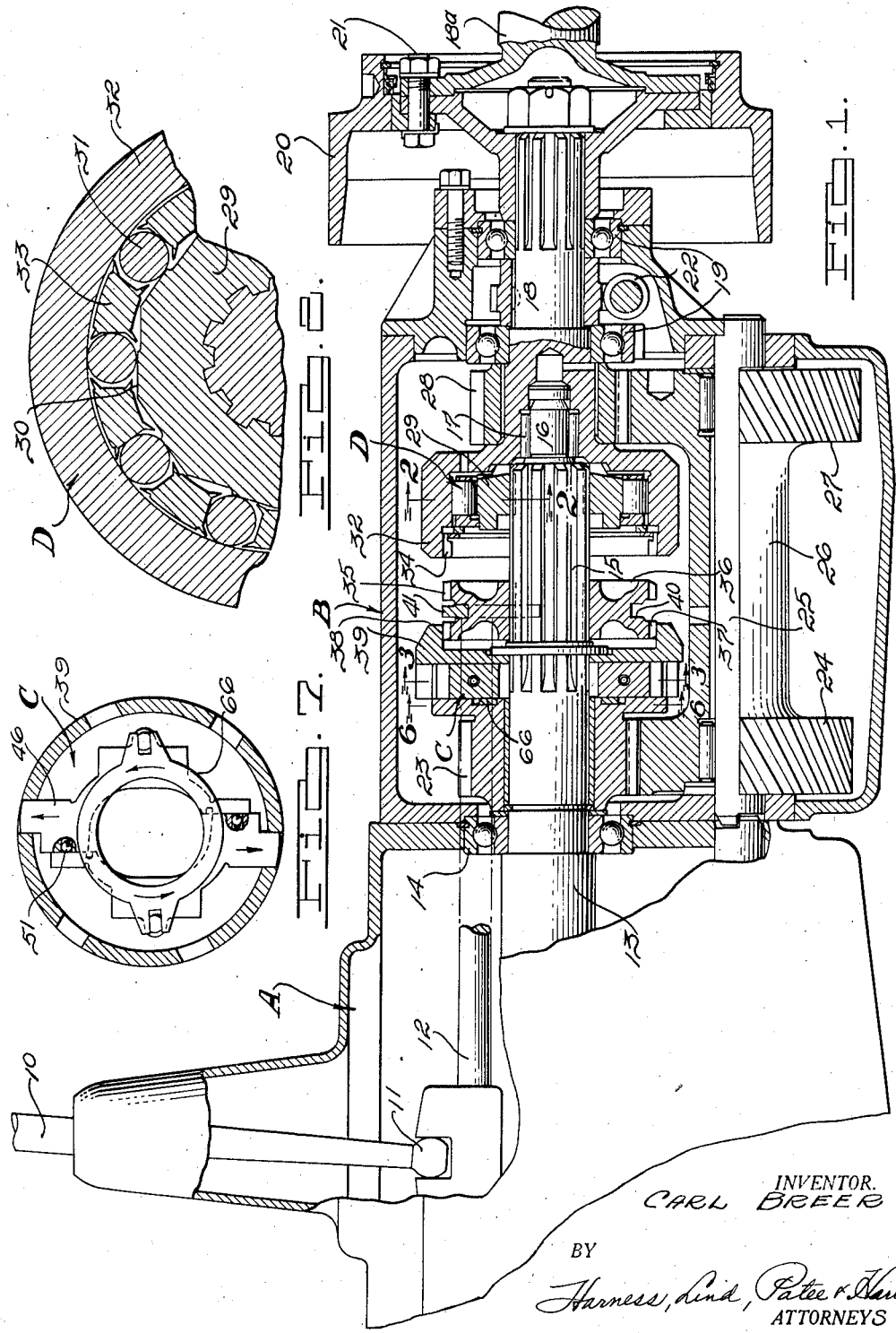
INVENTOR.
CARL BREER
BY
Harness, Lind, Patee & Harris
ATTORNEYS Oct. 18, 1938.  C. BREER  2,133,419
CLUTCH
Filed Jan. 18, 1934  2 Sheets-Sheet 2

INVENTOR.
CARL BREER
BY
Harness, Lind, Patee & Harris
ATTORNEYS

Patented Oct. 18, 1938

2,133,419

UNITED STATES PATENT OFFICE 2,133,419

CLUTCH

Carl Breer, Detroit, Mich., assignor to Chrysler Corporation, Detroit, Mich., a corporation of Delaware Application January 18, 1934, Serial No. 707,100

12 Claims. (Cl. 192—105)

This invention relates to clutches and refers more particularly to clutches of the type providing automatic engagement of relatively driven members.

It is an object of my invention to provide an improved clutch which will automatically connect parts in a driving mechanism and which will automatically release the connected parts under predetermined desired conditions of relative speeds of such parts.

A further object of my invention resides in the provision of an improved clutch having one or more pawls, dogs, or clutching members adapted to move into clutch engaging or disengaging positions in response to centrifugal forces acting on the pawls.

I preferably provide a cage or core adapted to carry a plurality of pawls, and a sleeve or shell provided with suitable slots or openings respectively adapted to receive the pawls under the desired conditions of clutching action.

My improved clutch is particularly adapted for use in driving mechanisms for motor cars or vehicles, where it is desired to vary the driving speed ratio between the vehicle engine or prime mover and the propelling ground wheels. Thus, my invention may be used to advantage in transmissions and other driving mechanisms for effecting automatic changes in the driving speed ratio, the cage being driven by either the engine or the vehicle ground wheels and the shell by the other. Thus, by relatively driving the clutch members by the engine and car, the action of my clutch is responsive to conditions of car speed so as to automatically vary the driving speed ratio under desired conditions. Other uses of my clutch will be apparent from the teachings of my invention.

A further important object of my invention resides in the provision of means for interconnecting the pawls whereby they are constrained to move in unison. Thus, by reason of my invention, the pawls will simultaneously move into or out of clutching action, minimizing wear and uniformly distributing the load to the pawls at all times during movement of the pawls.

In the preferred form of my invention, I have provided an equalizer member extending around the axis of the pawl carrying cage, the equalizer interconnecting the pawls for simultaneous action. This equalizer will further compensate for any inequalities in the setting of the springs acting on the pawls, or for any inequalities in friction at the pawls, the resulting clutching or declutching action having improved characteristics of smoothness.

Further objects and advantages of my invention reside in the novel combination and arrangement of parts more particularly hereinafter described and claimed, reference being had to the accompanying drawings in which:

Fig. 1 is a cross-sectional elevational view through the power transmission mechanism illustrating my clutch as a part thereof.

Fig. 2 is an enlarged sectional view through line 2—2 of Fig. 1 showing a portion of the free wheeling or overrunning clutch.

Fig. 7 is a somewhat diagrammatic view of my clutch shown in Fig. 3, the parts being shown in the clutch engaging position.

Figures 3, 4:
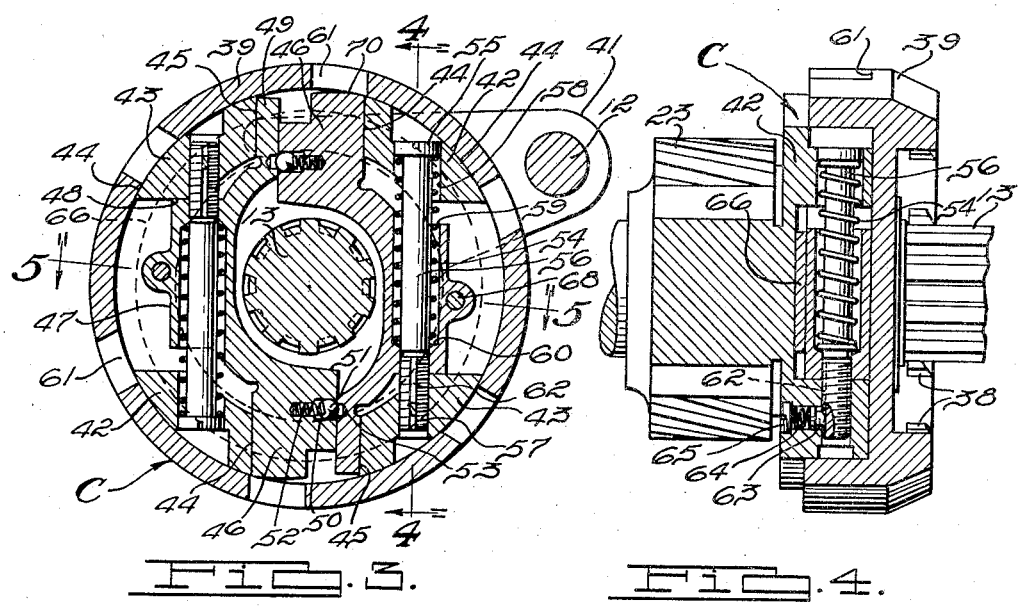
Fig. 3 is an enlarged sectional view through line 3—3 of Fig. 1 showing my improved clutch.
Fig. 4 is a sectional view through the clutch shown in Fig. 3, the section being taken along line 4—4 thereof.
Figures 5, 6:
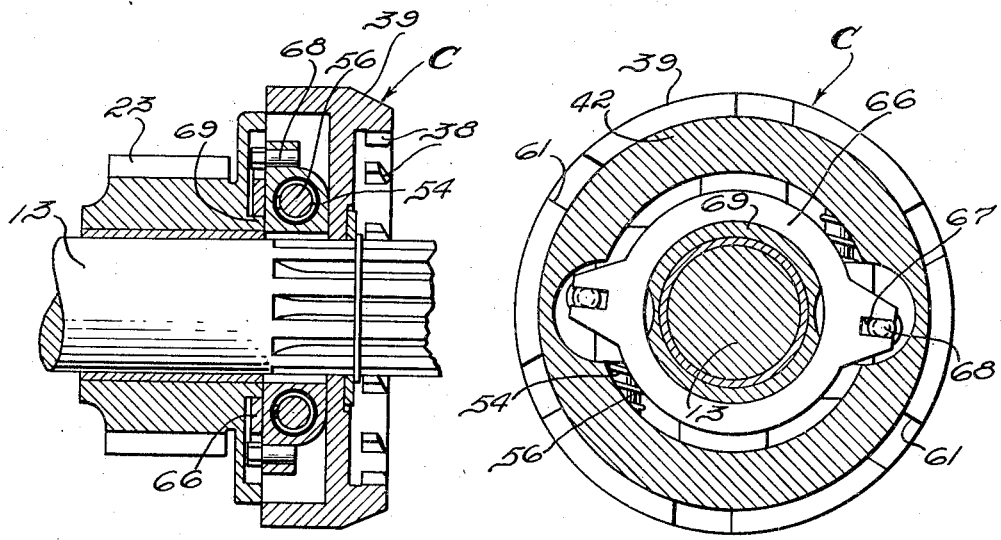
Fig. 5 is a sectional view through the clutch shown in Fig. 3, the section being taken along line 5—5 thereof.
Fig. 6 is a sectional view through line 6—6 of Fig. 1 showing my clutch pawl equalizing device.

In the drawings, I have illustrated my clutch in a power transmitting mechanism for a motor vehicle, such mechanism including the transmission A and the auxiliary transmission or overdrive mechanism B at the rear end thereof.

The transmission A may be of any suitable type such as the conventional selector type operated by the well-known shifter lever 10, the operating end 11 of which is illustrated in Fig. 1 in engagement with the reverse selector 12 ready to move this selector to the right for effecting the usual reverse drive through the transmission. The purpose of such arrangement will be presently apparent. The usual motor vehicle engine or prime mover (not shown) is adapted to transmit power in the customary manner, for example, through transmission A, the power being taken off by a drive shaft 13 rotatably supported in bearings, one of which is illustrated at 14.

Shaft 13 extends rearwardly into the overdrive mechanism B and is splined at 15 adjacent the end 16 thereof which is centered by bearing 17 in the forwardly extending end of driven shaft 18, 18ª. This driven shaft is mounted in suitable bearings 19 and extends rearwardly for driving the rear vehicle wheels (not shown) in the customary manner. If desired, the usual propeller shaft brake drum 20 may be mounted by a series of fasteners 21 in fixed relation with shaft 18, the shaft portions 18, 18ᵃ being thereby connected as a unit. If desired, the usual speedometer drive may be taken from shaft 18 by reason of the gearing illustrated at 22.

Freely mounted on shaft 13 at the front end of the overdrive mechanism B is a gear 23 driven by a gear 24 rotatable on a fixed countershaft 25 and having an integral sleeve 26 formed with a gear 27. The latter gear is driven by gear 28 keyed to shaft 18, the countershaft gearing 28, 27, 24, 23 being thereby adapted to at all times drive the automatic clutch C from and with the driven shaft 18. This countershaft gear train determines the overdrive ratio as will be presently apparent, and when shaft 13 is directly driving the shaft 18 through the overrunning clutch or free wheeling clutch D, the automatic clutch C will be driven at a slower speed than that of the drive shaft 13, it being understood that, in such instance, clutch C is not in clutching position.

The free wheeling clutch D, best shown in Fig. 2, may be of any suitable form, the illustration showing a conventional device in which the inner cam member 29 is driven by the splines 15 of shaft 13, the cam faces 30 being engaged by cylinders 31 so that for the driving rotation of shaft 13 (clockwise as viewed in Fig. 2) the high sides of cam faces 30 will wedge the cylinders 31 between cam member 29 and the outer driven free wheeling member or pineapple 32 to establish a direct drive thereto. The usual spacer 33 maintains the cylinders in spaced position, it being apparent that whenever the engine slows down, the vehicle may, by reason of clutch D, overrun shaft 13, other conditions permitting such action as will be presently apparent. As shown in Fig. 1 the driven member 32 may be formed as an extension of shaft 18 or otherwise connected thereto in driving relation.

The driven free wheeling member 32 is formed with internal jaws or teeth 34 adapted to be engaged and locked with corresponding jaws or teeth 35 of a control or clutch sleeve 36 having splined engagement with splines 15. This sleeve has a second set of jaws or teeth 37 shown, in Fig. 1, in engagement with corresponding teeth internally formed at 38 on the shell 39 of clutch C, this shell being centered by shaft 13 but freely rotatable with respect thereto except when coupled therewith by reason of sleeve 36 as shown in Fig. 1.

Sleeve 36 has an annular groove 40 adapted to receive the shifter element 41 carried by the rear end of the reverse selector 12 so that when the shift lever 10 is actuated to move selector 12 to establish a reverse drive of shaft 13, as in reversing the motor vehicle, the sleeve 36 is thereby moved along splines 15 to disengage teeth 37, 38 and thereafter engage teeth 34, 35 in order to lock out the free wheel clutch D. It will be understood that I have omitted the details of the gearing of transmission A as such parts are well-known in the art and require no disclosure in detail.

Referring now to my automatic clutch C, best shown in Figs. 3 to 6, the gear 23 is provided with diametrically arranged pairs of lateral extensions or pawl guides 42 and 43, these extensions having arcuate faces 44 fitting within shell 39 as shown in Fig. 3. Extensions 42 have pawl engaging faces 44 and extensions 43 have similar bearing faces 45. Fitting within shell 39 are a pair of pawls 46, each having a face in sliding engagement with a face 44 of extension 42 and each extending generally inwardly of the pawl carrying cage comprising the clutch parts within shell 39. Thus each pawl is formed with a yoke portion 47 normally seated at 48 on an extension 43, each yoke portion having a guide 49 slidable intermediate a face 45 and the side of the other pawl opposite the side thereof in engagement with the face 44. Each pawl has a slot 50 receiving a ball detent 51 urged outwardly thereof by a spring 52 for engaging the ball in a keeper 53 of the end 49 associated therewith.

In order to normally urge the pawls inwardly of the pawl cage to position the parts as shown in Fig. 3, I have provided springs 54, each spring reacting on the head 55 of the screw bolt 56 threadedly engaging opening 57 in extension 43. In order to receive the screw bolt, extensions 42 and yoke portions 47 are respectively provided with openings 58 and 59 aligned with opening 57, each spring 54 acting on a seat 60 of the associated yoke portion 47.

The shell 39 has a plurality of circumferentially spaced pawl receiving slots or openings 61 suitably spaced so that diametrically arranged pairs of slots will simultaneously register with the pawls 46 so as to receive said pawls under conditions hereinafter more apparent.

The threaded ends of screw bolts 56 are each slotted at 62 to receive the detent 63, shown in Fig. 4, urged toward the slot by a spring 64 abutting set screw 65. It will be apparent that the pawl springs 54 may be readily reached and adjusted from without shell 39 by aligning each of the bolt heads 55 with one of the slots 61. Prior to rotatably adjusting the screw bolts, the locks 63 associated therewith are released by removing the tension of springs 64 by partially threading the set screws 65 outwardly. The screw bolts 56 may then be rotated to further compress or relieve the springs 54 to effect the desired setting governing the action of the pawls, after which the detents 63 are restored to their positions locking the associated bolts against accidental displacement. Furthermore, by aligning any bolt 56 with one of the shell openings 61, the bolt and spring 54 may be readily removed and replaced without tearing down the clutch parts.

An important feature of my invention resides in the provision of means for equalizing or synchronizing the action of pawls 46 so that they will move outwardly and inwardly in unison. I have illustrated this feature of my invention in the form of an equalizer ring 66 surrounding shaft 13 and having diametrically arranged outwardly opening slots 67, best shown in Figs. 6 and 7, for respectively receiving pins 68. One of the pins 68 is carried by each pawl yoke portion 47 and the ring 66 is rotatably guided by contact with a bearing sleeve 69. The pawls 46 are thus tied together for simultaneous movement.

The outer ends of pawls 46 are preferably provided with cam faces 70 acting on the inner edges of slots 61 to progressively release the pawls outwardly when the clutch shell and cage are rotating substantially together at a predetermined speed. When pawls 46 move outwardly in slots 61, such movement is limited by engagement of yoke portions 47 with projections 42, the yoke portions sliding on bolts 56.

In operation of the power transmitting mechanism, with the parts positioned as in Fig. 1, the engine will drive shaft 13 and hence the driven shaft 18, 18ᵃ to drive the vehicle forwardly in direct drive so far as the driving and driven shafts 13 and 18 respectively are concerned.

This direct drive takes place from shaft 13, through the free wheel clutch D and thence to driven shaft 18. When the vehicle tends to overrun the engine, such action may take place by reason of clutch D. During this direct drive the shell 39 will be driven by sleeve 36 at the speed of shaft 13 while the pawls will be rotated by gear 23 at a speed less than that of the driven shaft 18 by reason of the reduction through the countershaft gears 24, 27.

By way of illustrating one manner of operation of my automatic clutch C, this clutch is illustrated as being adapted to automatically lock out or to render the free wheel clutch D ineffective and to simultaneously drivingly connect sleeve 39 with gear 23 at a predetermined speed of rotation of shaft 18 and hence a predetermined speed of vehicle travel. When such clutching action takes place, the shaft 18 is driven from gear 23 as aforesaid and thence through the countershaft gear train to the shaft 18, such drive providing an overdrive or a higher speed of the driven shaft 18 than that of the driving shaft 13.

An overdrive is ordinarily desirable at only relatively high speeds of vehicle travel and hence, by a suitable setting of the pawl springs 54, supplemented somewhat by ball detents 51, the pawls may be held inoperative against the influence of centrifugal forces acting to move the pawls outwardly, until the desired predetermined critical speed has been reached. Assuming, by way of example, that such automatic overdrive is desired at approximately 50 miles per hour of vehicle travel, then, when the vehicle is being driven at this speed, the pawls are urged outwardly by centrifugal force ready to engage slots 61 of shell 39 when rotation of the pawl cage and shell become substantially uniform. Under the assumed conditions, springs 54 may be set so that the pawls tend to fly outwardly at a speed of shaft 18 corresponding to 50 miles per hour of vehicle travel, the pawls being restrained from moving outwardly, until the clutch parts are synchronized, by reason of the gear reduction which drives the pawls at a slower speed than that of the slots 61 which are driven directly from the drive shaft 13. Owing to the difference in rotational speeds of the slots and pawls, these parts pass each other with such rapidity that the pawls do not have time to move outwardly to engage the slots and the parts continue to slip until the operator momentarily releases or diminishes the power of the engine applied to the shaft 13 so as to permit the shell 39 to decelerate. In decelerating, the shell 39 obviously very quickly drops to the speed of the pawl cage, momentarily synchronizing the pawls with a pair of diametrically arranged slots, the pawls thereupon being guided out, during rotation thereof, by cam faces 70 for effecting initial engagement of the pawls in the slots. Once engaged, the centrifugal force acting on the pawls carries them outwardly for fully engaging the slots of shell 39 and the overdrive immediately takes place with the free wheel clutch D locked out as aforesaid.

Prior to the speed at which it is desired to urge the pawls outwardly, the ball detents 51 stabilize the pawls against hunting or fluctuating movement, such detents also holding the parts against rattle.

As long as the engine drives the vehicle at or above the aforesaid overdrive speed, with the pawls 46 engaged in slots 61, the clutch C will remain engaged. However, when the vehicle slows down below the aforesaid 50 miles per hour, in the assumed illustration, the pawls 46 will be urged to their retracted or normal position of Fig. 3, such retraction taking place just as soon as the friction of the drive is relieved or reversed between the sides of the slots and pawls. Thus when the vehicle driver momentarily releases the usual accelerator pedal to cause the vehicle to drive the engine, this reversal of drive permits retraction of the pawls and the power transmission is then again operating without the overdrive and through the free wheeling clutch D.

When it is desired to drive the vehicle in reverse, shifter 12 is moved to actuate sleeve 36 to the right, as viewed in Fig. 1, so as to disengage teeth 37, 38 and to engage teeth 34, 35 to lock out the free wheel clutch D. This reverse drive thus passes from shaft 13 to sleeve 36, driven member 32 and thence to the driven shaft 18, it being understood that shaft 13 has its rotation reversed by the usual reversing mechanism of transmission A.

In Fig. 7, I have somewhat diagrammatically illustrated the positions of the pawls 46 when the automatic clutch C is in the clutching position for operating the overdrive.

I desire to point out that instead of driving the slot carrying sleeve directly from the drive shaft 13 and hence from the engine, and the pawl cage from the driven shaft 18, such parts may be readily reversed if desired so as to drive the pawl cage directly from the engine and the slots from the vehicle or driven shaft 18. The illustrated arrangement is preferred, however, where my automatic clutch is used in an overdrive mechanism, since the engine continues to drive at the overdrive speed from the time when the pawls are engaged in the pawl slots, viz., at a speed slower than in direct drive for the same vehicle speed. With the suggested reversal of clutch parts, the engine would have to operate considerably faster, by the overdrive ratio, than the driven shaft to speed up the slot carrying member and then by slowing down the engine momentarily to reduce the speed of the pawl cage to that of the slot carrying member, the pawls will engage the slots. In such instance, it is therefore apparent that the engine would have to drive at a speed greater than its speed for the overdrive setting of the pawls in order to establish the proper conditions for effecting actuation of the automatic clutch C.

While I have illustrated my clutch in connection with an overdrive mechanism for motor vehicles, I desire to point out that this is but one useful application or use of my clutch. My improved clutch may be used to advantage wherever a clutching action between two rotatable parts is desired, particularly where such action is to be automatically responsive to desired conditions of relative rotatable speeds of the two members to be clutched or declutched.

Furthermore, I do not limit my invention, in the broader aspects thereof, to the particular combination and arrangement of parts shown and described for illustrative purposes, since various modifications will be apparent within the teachings of my invention as defined in the appended claims.

What I claim is:

1. In a clutch for drivingly connecting driving and driven members, a pawl carrying structure connected to one of said members, a pawl receiving structure connected to the other of said members, a plurality of pawls carried by the pawl carrying structure and adapted for movement in response to rotation of the pawl carrying member, means carried by said pawl receiving member for receiving said pawls to positively connect said structures, yielding means urging said pawls to their disengaged position, said pawls having yoke portions, and means engaging said yoke portions for synchronizing movement of said pawls.

2. In a clutch for drivingly connecting driving and driven members, a pawl carrying structure connected to one of said members, a pawl receiving structure connected to the other of said members, a plurality of pawls carried by the pawl carrying structure and adapted for movement in response to rotation of the pawl carrying member, means carried by said pawl receiving member for receiving said pawls to positively connect said structures, yielding means urging said pawls to their disengaged position, one of said pawls having a substantially diametrically positioned guide portion engaging another of said pawls, and means synchronizing movement of said pawls, said synchronizing means engaging one of said pawls intermediate the said guide portion thereof and the clutching portion thereof.

3. In a centrifugally operated clutch, a rotatable shell formed with a plurality of pawl-receiving slots, a rotatable cage provided with a plurality of radially slidable pawls actuated in response to centrifugal force, each of said pawls having a portion thereof adapted to engage one of said slots to positively connect said shell and cage, each of said pawls having a guide portion disposed substantially diametrically opposite its engaging portion and an intermediate portion adapted to provide a spring abutment, a spring acting on said abutment of each pawl, and means connecting said intermediate portions of said pawls for synchronizing clutching movement thereof.

4. In a centrifugally operated clutch, a rotatable shell formed with a plurality of pawl-receiving slots, a rotatable cage provided with a plurality of radially slidable pawls actuated in response to centrifugal force, each of said pawls having a portion thereof adapted to engage one of said slots to positively connect said shell and cage, each of said pawls having a guide portion disposed substantially diametrically opposite its engaging portion and an intermediate portion adapted to provide a spring abutment, a spring acting on said abutment of each pawl, and an equalizing ring carried by said cage and connected to the intermediate portions of said pawls for synchronizing movement thereof.

5. In a centrifugal clutch for connecting two members, a rotatable shell connected to one of said members and having a plurality of slots, a cage connected to the other of said members and carrying a pair of centrifugal force operated pawls rotatable within said shell, each of said pawls having a portion thereof adapted for projection into one of said slots when said shell and cage are rotated at substantially the same speed at or above a predetermined minimum speed, a coil spring acting on each of said pawls in opposition to movement thereof by centrifugal force, said springs being disposed adjacent opposite sides of the member to which said cage is connected, and an equalizer member carried by said cage and extending at least partially around the last said member into connection with said pawls adjacent said springs for equalizing movements thereof.

6. In a centrifugal clutch for connecting two members, a rotatable shell connected to one of said members and having a plurality of slots, a cage connected to the other of said members and carrying a pair of centrifugal force operated pawls rotatable within said shell, each of said pawls having a portion thereof adapted for projection into one of said slots when said shell and cage are rotated at substantially the same speed at or above a predetermined minimum speed, a coil spring acting on each of said pawls in opposition to movement thereof by centrifugal force, said springs being disposed adjacent opposite sides of the member to which said cage is connected, an equalizer ring carried by said cage and disposed around the last said member, and means connecting said ring to said pawls at substantially diametrically opposed points.

7. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having end portions slidable in both of said openings, one of said end portions of each of said pawls being adapted for projection into one of said slots, and means connecting said pawls for equalizing movement thereof.

8. In a centrifugal clutch, a rotatable shell having a plurality of slots, a pawl carrying structure rotatable within said shell and having a pair of substantially diametrically arranged outwardly extending openings, a pair of pawls carried by said structure, each of said pawls having end portions slidable in said openings, one of said end portions of each of said pawls being adapted for projection into one of said slots, the other of said end portions of each of said pawls slidably engaging the other of said pawls, and means connecting said pawls for equalizing movement thereon.

9. In a centrifugally operated clutch, a rotatable shell having a plurality of pawl-receiving slots, a rotatable cage mounted on a shaft concentric with the shell and carrying a pair of pawls actuated by centrifugal force for radial sliding movement, each of said pawls having an enlarged end a portion of which is adapted to engage one of said slots, each of said pawls having a reduced yoke portion extending inwardly of said cage and at least partially around said shaft to provide a spring seat relatively remotely spaced from said enlarged end portion, springs acting on said spring seats respectively, and means connecting said pawl yoke portions for equalizing clutching movement of said pawls.

10. In a centrifugal clutch for drivingly connecting driving and driven relatively rotatable shafts, relatively rotatable pawl carrying and pawl engaging means one being adapted for driving connection to said driving shaft and the other to said driven shaft, a pair of centrifugal force operated pawls carried by said pawl carrying means, said pawl engaging means being formed with a plurality of slots, each of said pawls having an end clutching portion adapted to positively clutchingly engage one of said slots in response to substantially synchronized rotation of each pawl and slot at a predetermined speed, one of said shafts extending axially through said pawl carrying means, each of said pawls having an end guide portion disposed substantially diametrically opposite the clutching end portion thereof and an intermediate portion connecting said end portions and at least partially surrounding the last said shaft, said pawl carrying means having guideways slidably engaging said end portions of said pawls, a pair of coil springs each spring thrusting against one of said pawl portions other than said clutching end portion for opposing centrifugal force pawl movement, and pawl movement control means so constructed and arranged as to prevent undesired centrifugal force movement of one of said pawls relative to centrifugal force movement of the other of said pawls.

11. In a centrifugal clutch for drivingly connecting driving and driven relatively rotatable shafts, relatively rotatable pawl carrying and pawl engaging means one being adapted for driving connection to said driving shaft and the other to said driven shaft, a pair of centrifugal force operated pawls carried by said pawl carrying means, said pawl engaging means being formed with a plurality of slots, each of said pawls having an end clutching portion adapted to positively clutchingly engage one of said slots in response to substantially synchronized rotation of each pawl and slot at a predetermined speed, one of said shafts extending axially through said pawl carrying means, each of said pawls having an end guide portion disposed substantially diametrically opposite the clutching end portion thereof and an intermediate portion connecting said end portions and at least partially surrounding the last said shaft, said pawl carrying means having guideways slidably engaging said end portions of said pawls, a pair of coil springs each spring thrusting against one of said pawl portions other than said clutching end portion for opposing centrifugal force pawl movement, and pawl movement control means including an element engageable with each of said pawls and so constructed and arranged as to prevent undesired centrifugal force movement of one of said pawls relative to centrifugal force movement of the other of said pawls.

12. In a device for drivingly connecting driving and driven members, a pawl carrying structure adapted for driving connection to one of said members, a pawl receiving structure adapted for driving connection to the other of said members, said pawl receiving structure having a substantially cylindrical shell formed with a plurality of slots, a pair of pawls carried by said pawl carrying structure, each pawl having a clutching portion thereof adapted for projection into one of said slots in response to rotation of said structures at substantially the same predetermined speed, a plurality of yielding means respectively urging each of said pawls to its retracted position in opposition to centrifugal force acting thereon, pawl movement control means comprising a ring operably connected with each of said pawls to prevent undesired centrifugal force movement of one of said pawls relative to centrifugal force movement of the other of said pawls, and latching means for holding each of said pawls against clutching projection until said structures are rotated at substantially the same predetermined speed as aforesaid.

CARL BREER.